March 29, 1966

J. P. RICH 3,242,944

PRESSURIZED FLUID INLET FITTING

Filed June 6, 1963

United States Patent Office 3,242,944
Patented Mar. 29, 1966

3,242,944
PRESSURIZED FLUID INLET FITTING
John P. Rich, Nashua, N.H., assignor, by mesne assignments, to Improved Machinery, Inc., Nashua, N.H., a corporation of Delaware
Filed June 6, 1963, Ser. No. 286,058
10 Claims. (Cl. 137—527)

This invention relates to an inlet fitting for fluids under pressure. More particularly the invention relates to a device for admitting or injecting fluids under pressure into a chamber or system containing a different fluid or substance flowing under lower pressure. Such inlets are used, for example, in mixing chemicals or steam with wood pulp stock prior to or during processing.

One problem in such pressurized fluid inlets has been the tendency of the inlet openings to plug and become blocked, particularly if the pressure of the incoming fluid drops below a certain point relative to the pressure of the substance into which the fluid is being injected. In such case, the normal direction of fluid flow is reversed and the inlet opening or openings may fill up and prevent proper injection again when the fluid pressure is restored.

The principal object of this invention is to provide a pressurized fluid inlet fitting that will not become plugged or blocked upon failure of adequate injection pressure.

Another object is to provide such an inlet that is simple in construction, dependable in action and economical to manufacture and install.

A further object is to provide such an inlet that is adapted for use in a variety of different locations or situations and therefore may be installed in existing equipment as well as in newly designed apparatus.

The objects of this invention are met, according to a preferred embodiment, by providing as a unitary article a nozzle or fitting of elongated hollow form, adapted to be connected to a source of fluid under pressure and mounted to project through the wall of a vessel or conduit containing a substance into which the fluid is to be injected or introduced. A portion of one side of the fitting is slotted to provide an inlet opening covered by a pivoted, one-way valve or gate piece resiliently biased to swing toward a position closing the inlet slot. The support and bias of the slot-closing gate is made through a torsion bar element contained within the fitting, prestressed so that the gate will swing to slot-opening position only when the pressure of fluid in the fitting as compared to pressure in the chamber outside the fitting exceeds a predetermined value.

Other objects, advantages and further details of the invention will be clear from the following description and claims, taken with the accompanying drawing in which is illustrated an example of fluid inlet fitting embodying the concepts and structures set forth generally above.

Figures 1, 2, 3:
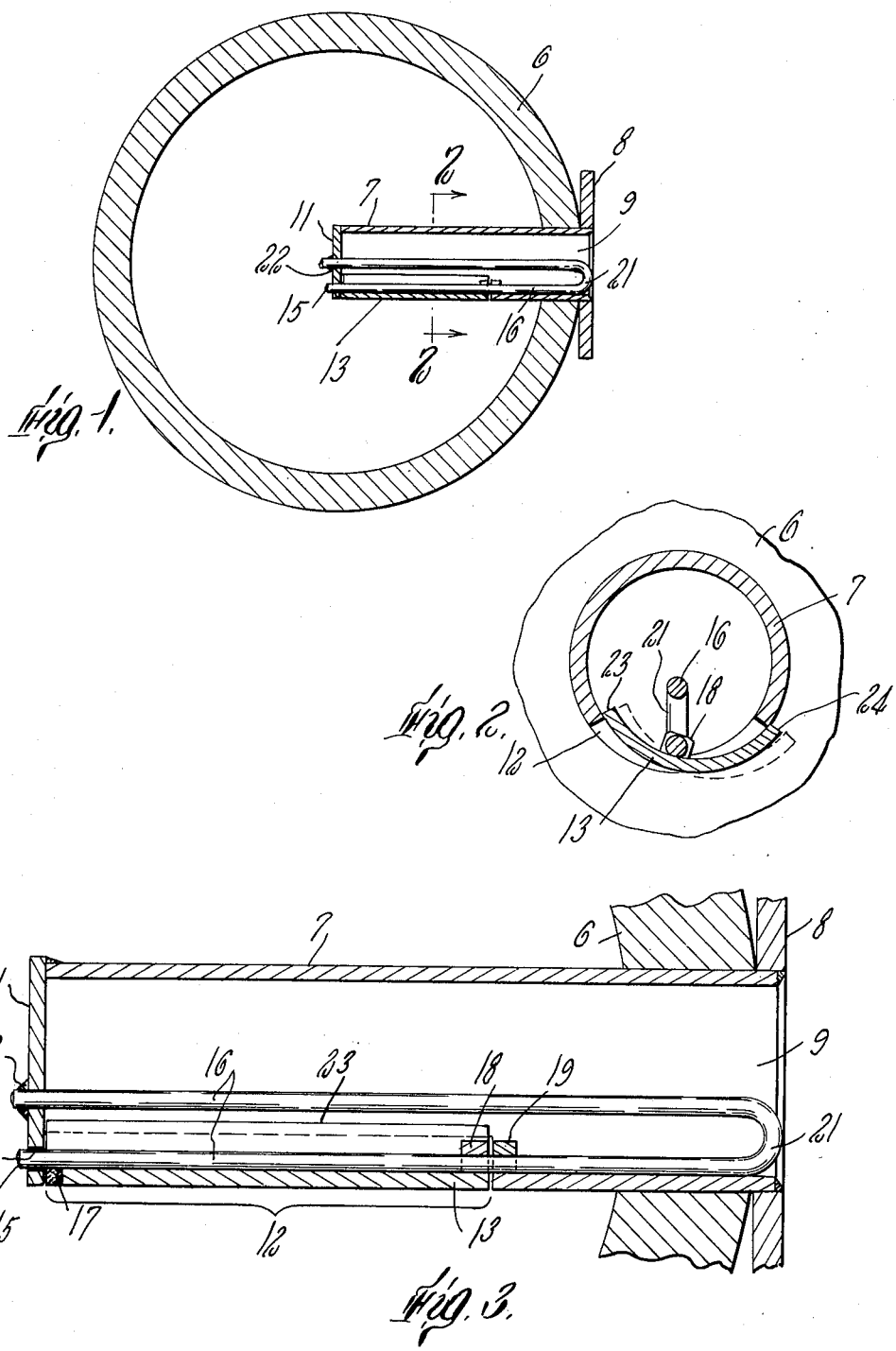
FIG. 1 is a transverse sectional view through a chamber or conduit and through an exemplary inlet fitting for introducing pressurized fluid thereinto.
FIG. 2 is an enlarged transverse sectional view through the inlet fitting FIG. 1, substantially on the line and in the direction of the arrows 2—2 thereof.
FIG. 3 is an enlarged longitudinal sectional view through the fitting, at right angles to the view of FIG. 2, being in effect an enlarged view of the inlet portion of FIG. 1.

In order to indicate one of the ways in which the invention may be used, it will be described herein as a nozzle or fitting to introduce liquid chemicals or steam under pressure into wood pulp stock contained and flowing within a mixing chamber. Obviously, the fitting of the invention may be used to inject other pressurized fluids into other substances contained or carried in other kinds of receptacles. The drawing indicates a generally cylindrical mixing chamber or conduit 6 through which pulp stock is being moved or impelled for mixture with steam or chemicals. The general direction of movement of the stock through the mixing chamber past the fluid inlet is indicated by the arrows in FIG. 2.

The main body of a device according to the present invention is an elongated hollow housing, fitting or nozzle 7, preferably of generally cylindrical tubular form as shown, carrying a mounting flange 8 at one end. The mounting end of the nozzle is open as at 9 and the open end of the fitting is suitably secured as by the flange 8 or otherwise to a source of steam, chemicals or other fluid under pressure. The provision of such fluids under pressure is well known and need not be shown, and the plumbing or piping connections leading to such pressure sources may also be of any desired known character.

The cylindrical tubular housing 7 is mounted, as by the flange 8 and any suitable seal, to project through the wall of the chamber 6 and extend transversely across and into the path of general movement of pulp or other substance being conveyed or mixed therein. The inner unsupported end of the tubular body 7 is closed as by an appropriate end wall 11 brazed, welded or otherwise suitably secured in place. The fluid inlet opening proper is provided by a slot or segmental cylindrical side opening 12 in the body 7 wholly within the chamber 6, the width of which is indicated in FIG. 2 and the length of which is shown in FIG. 3 in accordance with proportions found satisfactory in one arrangement.

The inlet slot 12 however, is not entirely open for the injection of fluid under pressure, but a pivoted curved gate piece or valve member 13 of segmental cylindrical form is used to cover and span the length and width of the slot. The pivotal mounting of the gate is made through a journal hole 14 in the end wall 11 which rotatably carries one end 15 of a pivot and torsion bar or rod 16. The torsion bar is firmly secured to one end of the gate piece intermediate its side edges as by welding, brazing or the like at 17. The balance of the torsion bar is not secured to or supported by the valve member but first extends closely adjacent the length of this gate and passes rotatably through a hole in a pivot piece 18 which is secured to or formed on the other end of the gate piece intermediate its side edges near the other end of the slot 12. From the pivot piece 18 the torsion bar 16 then extends rotatably through a journal piece 19 which is secured to or formed on the fitting 7 at that end of slot 12.

The remainder of the bar or rod 16 functions strictly as a torsion member without serving as a pivot element and for this purpose it is extended to the open end 9 of the body where a reverse bend or loop 21 is provided, the other end of the rod being extended back through the fitting and to and through the end wall 11 where it is welded, brazed, or otherwise firmly secured as at 22 to the closed end of the fitting. By the reverse bending of the torsion bar its effective length is increased and it lies wholly within the confines of the fitting.

In manufacturing this fitting, it should be noted that the torsion bar is welded or secured to the gate only near one end, this end of the bar being pivotally mounted in the fitting. The welding or fixing of the other end of the bar to the fitting as at 22 is performed only after the first end has been welded or secured to the gate. According to one arrangement found satisfactory, before welding the bar to the end wall 11 as at 22 the bar is pre-loaded approximately 2° in the closing direction. This gives the gate an initial spring bias toward its closing position so that a certain excess of steam or other fluid pressure inside the fitting will be required over the pressure of pulp or other substance outside the fitting before the valve gate will tilt and open.

In FIG. 2 the open position of the gate is indicated in dotted lines and it will be seen that the pivot axis for the gate is eccentric, that is, it is nearer the inner edge 23 of the gate than it is to the outer edge 24 so that sufficient internal pressure in the nozzle will cause the gate to rotate clockwise as seen in FIG. 2 and open a predetermined amount at the outer edge 24, this amount being governed by the configuration of the torsion bar and by the pressure inside the fitting. It may also be noted that the preferred size and mounting of the gate is such that the edge 23 of the gate overlaps and lies inside one edge of the slot while the other edge 24 of the gate overlaps and lies outside the other edge of the slot when the gate is in closed position. When tilted, edge 23 therefore opens inwardly and edge 24 opens outwardly.

With the above arrangement, if internal fluid pressure in the fitting should fail, the preloaded torsion bar will twist and rock the gate counterclockwise to the position shown in full lines in FIG. 2 and close the inlet slot entirely. This will prevent the pulp or other substance outside of the fitting from back-flowing into the inlet slot and blocking or plugging it. When fluid pressure inside inside the fitting is again at a proper level, the eccentric mounting of the gate will cause tilting of the gate as above explained so that the edge of the slot opposite the outwardly opening gate edge 24 will be freed to inject fluid in a downstream direction, considering the general direction of flow of pulp or other substance through the chamber 6. This tilting will break away and clear any accumulated debris from the edges of the slot and edges of the valve gate. Some fluid under pressure will be injected from the edge of the inlet slot 12 opposite the inwardly opening edge 23 of the gate, but such fluid will be directed also in a general downstream direction because of the curvature of the cylindrical wall of the fitting 7 adjacent that edge of the slot.

The simplicity of this fitting commends its use as a pressurized fluid inlet in many situations. The preferred cylindrical outer form of the nozzle with the tilting segmental cylindrical valve gate affords a minimum of projecting surfaces or parts for impeding the flow of fluid from the fitting or the flow of the other substances past the outside of the fitting. Cleaning or similar maintenance of the nozzle over relatively long periods of operation is therefore unnecessary.

As will be evident from the foregoing description, certain aspects of this invention are not limited to the particular details set forth as an example, and it is contemplated that various and other modifications and applications of the invention will occur to those skilled in the art. It is therefore, intended that the appended claims shall cover such modifications and applications as do not depart from the true spirit and scope of the invention.

What is claimed as new and is desired to be secured by Letters Patent of the United States is:

1. A fitting for introducing a fluid under pressure into a chamber, comprising
   a hollow body mounted to project into said chamber,
   means connecting said body to a source of said fluid under pressure,
   said body having a slot opening therein within said chamber,
   a gate piece spanning said slot,
   means pivotally supporting said gate piece on said body for tilting movement with respect thereto between a position in which said gate piece closes said slot and a position in which said gate opens said slot for discharge of fluid under pressure from said body, and
   a torsion bar within said body biasing said gate piece toward said slot-closing position,
   said bar secured to both said gate piece and said hollow body and extending therebetween.

2. A fitting as claimed in claim 1, said torsion bar also comprising said means pivotally supporting said gate piece on said body.

3. A fitting for introducing a fluid under pressure into a chamber, comprising
   an elongated hollow body mounted to project into said chamber,
   means connecting said body to a source of said fluid under pressure,
   said body having a slot opening therein extending lengthwise of said body within said chamber,
   a gate piece spanning said slot, and
   a torsion bar entirely within said body biasing said gate piece toward a slot-closing position,
   said bar, adjacent one end, secured at one point to said gate piece and pivoted on said hollow body, said bar pivotally supporting said gate on said body at another point and said bar, adjacent its other end, secured to said hollow body,
   whereby said bar serves both as a pivotal support and as the bias for said gate piece to open said slot for discharge of fluid under pressure from said hollow body.

4. A fitting for introducing a fluid under pressure into a substance flowing through a chamber, comprising
   a hollow cylindrical body mounted to project into said chamber,
   an end wall closing the projecting end of said body, the other end of the body being open,
   means connecting the open end of said body to a source of said fluid under pressure,
   said body having a side opening therein extending lengthwise of said body within said chamber,
   a segmental cylindrical gate piece spanning said side opening,
   means pivotally supporting said gate piece at its ends on said body for tilting movement with respect thereto between a position in which said gate piece closes said side opening and a position in which said gate opens said side opening for discharge of fluid under pressure from said body downstream of the flow of said substance through said chamber, and
   a torsion bar extending lengthwise within said body, biasing said gate piece toward said position closing said side opening,
   said bar secured at one end to said gate piece and at its other end secured to said hollow body and serving as the aforesaid means pivotally supporting said gate piece on said body.

5. A fitting as claimed in claim 4, said torsion bar being reversely bent between said one end secured to said gate and said other end secured to said body.

6. A nozzle for introducing fluid under pressure into a substance flowing through a chamber, comprising
   a cylindrical tubular body mounted to project into said chamber transversely of the flow of said substance therethrough,
   an end wall closing the end of said body within said chamber,
   the other end of said body being open outside said chamber,
   means connecting the outside open end of said body to a source of said fluid under pressure,
   said body having a segmental cylindrical opening therein with side edges extending lengthwise of said body within said chamber,
   a segmental cylindrical valve member with side edges covering said opening,
   said valve member having one side edge overlapping one side edge of said opening and lying inside said tubular body, said valve member having its other side edge overlapping the other side edge of said opening and lying outside said tubular body,
   means pivotally supporting said valve member between its edges on said body for sidewise tilting movement with respect thereto between a position in which said valve member closes said opening and a position in which the outside edge of said valve opens for discharge of fluid under pressure in a direction from said body downstream of the flow of said substance through said chamber, and means within said body biasing said valve member toward its closed position upon failure of fluid pressure in said body.

7. A nozzle as claimed in claim 6,
said means pivotally supporting said valve member being located nearer said side edge lying inside body than to said side edge lying outside said body.

8. A nozzle as claimed in claim 6,
said means biasing said valve member comprising a prestressed torsion bar secured to said valve member adjacent one end of said bar and secured to said tubular body adjacent the other end of said bar.

9. A nozzle as claimed in claim 8,
said torsion bar also comprising said means pivotally supporting said valve member.

10. A nozzle as claimed in claim 8,
said torsion bar being reversely bent, lying entirely within said nozzle body and secured to said body at said end wall thereof.

No references cited.

ISADOR WEIL, *Primary Examiner.*

D. MATTHEWS, *Assistant Examiner.*